Oct. 6, 1953     O. SEIDENBERG     2,654,164
ABACUS
Filed July 21, 1953     2 Sheets-Sheet 1
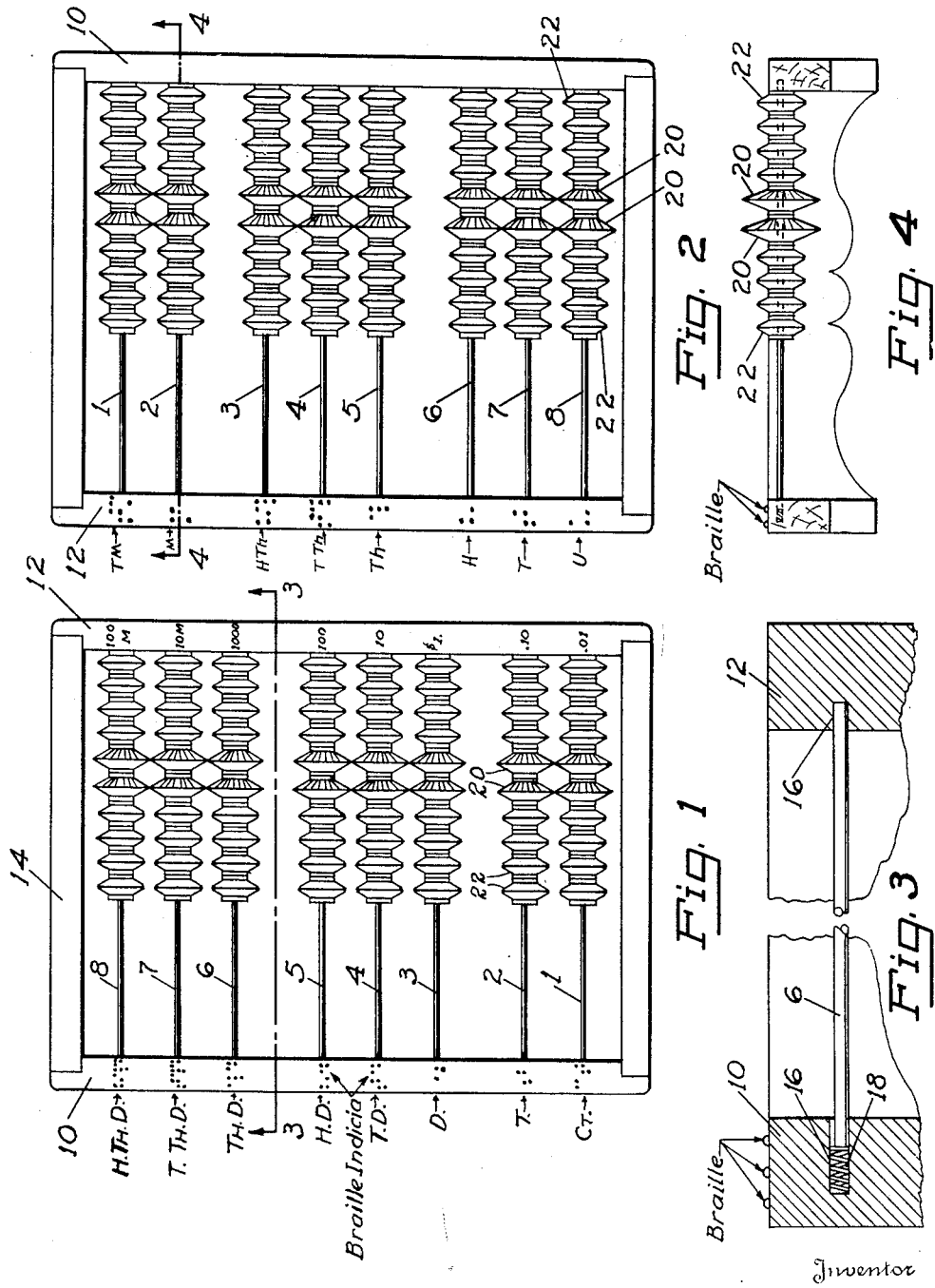
Inventor
*Oscar Seidenberg*
By Martin T. Fisher,
Attorney Oct. 6, 1953 — O. SEIDENBERG — 2,654,164
ABACUS
Filed July 21, 1953 — 2 Sheets-Sheet 2
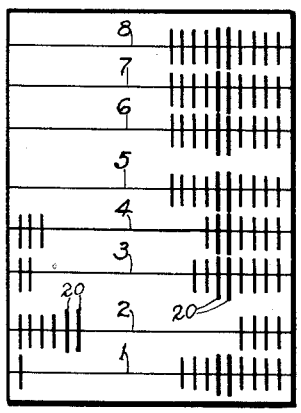
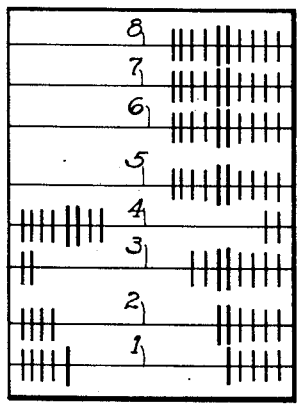
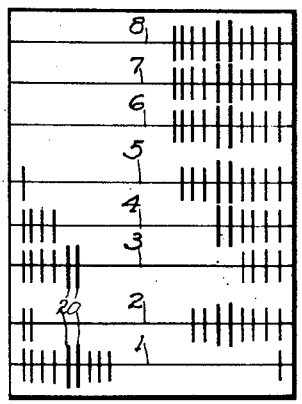
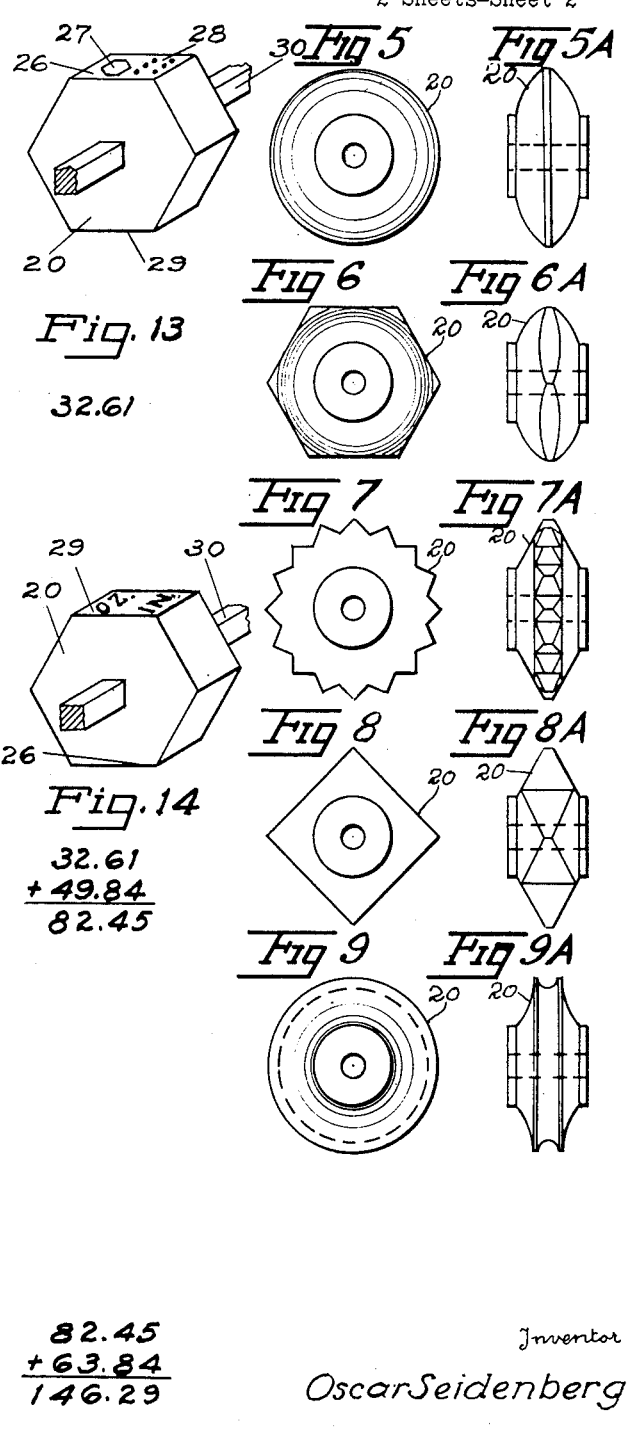
Inventor
Oscar Seidenberg
By Martin T. Fisher, Attorney.

Patented Oct. 6, 1953

2,654,164

UNITED STATES PATENT OFFICE 2,654,164

ABACUS

Oscar Seidenberg, Washington, D. C.

Application July 21, 1953, Serial No. 369,267

3 Claims. (Cl. 35—33)

This application is a refiling of applicant's earlier application, Serial No. 606,448, filed July 21, 1945, now abandoned. No continuity is claimed with respect to said abandoned application.

This invention is an improved abacus, embodying certain new features for performing addition, subtraction, multiplication and division with speed and accuracy; it may be used in offices and stores; it may be used in schools for instructing children in the principles of addition, subtraction, multiplication and division; it may be used in teaching addition, subtraction, multiplication and division to the blind, as well as used by the blind in commercial transactions in offices and stores.

The principal object of the invention is to provide an abacus in which certain of the counters or sliders, such for example, as the fifth and sixth in the usual group of ten, are made of different size or shape, or both, so that such fifth and sixth sliders stand out prominently to the eye of the user, and equally prominently to the sensitive trained fingers of the blind. Since ten counters are used on each row, the user knows that there are four counters on either side of each of the enlarged fifth and sixth counters, which increases the efficiency, accuracy and speed of the user.

Another important object of the invention is to provide an abacus having Braille or similar indicia, readable by a blind person, for indicating the numerical values of the several rows of counters.

Another important feature of the invention is to provide a mounting for the rods usually used in an abacus, whereby such rods may be very readily removed and replaced, without affecting the other rods and without taking the frame apart.

Further advantages and features of the invention will be described in connection with the accompanying drawings, illustrating the preferred ways of carrying out the invention.

In these drawings:

Fig. 1 is a plan view of the abacus of my invention.

Fig. 2 is a similar plan view where the abacus is turned around from the position shown in Fig. 1.

Fig. 3 is a cross section taken on the line 3—3 of Fig. 1.

Fig. 4 is a section taken on the line 4—4 of Fig. 2.

Figs. 5 and 5A, 6 and 6A, 7 and 7A, 8 and 8A and 9 and 9A are side and edge views, respectively, of five different types of sliders or counters used with this invention.

Figs. 10, 11 and 12 are diagrammatic plan views, for illustrating the use of the invention; and Figs. 13 and 14 are perspective views showing modifications of the counters.

Referring now to these figures in which similar reference characters indicate similar parts, the abacus comprises the usual series of similar rods numbered 1 to 8, inclusive, mounted in side frame members 10 and 12. The frame is completed by end members 14. The side frame members 10 and 12 are provided with oppositely aligned sockets 16 for the rods, the sockets being deep enough so that each of them can accommodate a coil spring 18 as shown in Fig. 3, whereby the rods are held in their respective sockets; any rod may be readily and quickly removed or replaced by simply moving it lengthwise to compress the spring 18, which causes the other end of the rod to clear its socket, whereby the rod can be removed entirely, as desired, or for the purpose of changing or replacing the sliders carried by the rods. In place of spring 18, a piece of solid or sponge rubber could be used.

The rods 1 to 8 inclusive, carry the usual ten sliders or counters. Certain of these sliders, preferably the fifth and sixth, indicated by the numeral 20, are made substantially larger or of different shape or contour from the other smaller sliders indicated generally at 22, so that these enlarged sliders will not only stand out to the eye of the ordinary observer, but can be readily distinguished by the sensitive fingers of the blind. They are also preferably colored differently from the other sliders.

Figs. 5 to 9, inclusive, show, simply by way of illustration, some of the many possible forms or shapes which the enlarged sliders may assume. In Fig. 5, the enlarged slider is generally annular in form; in Fig. 6, it is hexagonal; in Fig. 7, it is provided with serrations; in Fig. 8, it is square and in Fig. 9, it is annular and provided with a peripheral groove, very readily distinguishable by touch.

One or both sides of the frame, preferably the left hand frame member 10, may be provided with Braille indicia abbreviations for indicating whatever numerical values are assigned to the sliders on each of the rods 1 to 8. The right hand frame member 12 may also be provided with any appropriate indicia for indicating numerical values as follows:

Member 10 may be provided with markings opposite each rod for indicating numerical values for the sliders on the respective rods, as follows:

For rod 1: CT (for cents)
For rod 2: T (for ten cents)
For rod 3: D (for dollars)
For rod 4: T. D (for tens of dollars)
For rod 4: T. D. (for tens of dollars)
For rod 6: TH. D. (for thousands of dollars)
For rod 7: T. TH. D. (for tens of thousands of dollars)
For rod 8: H. TH. D. (for hundreds of thousands of dollars)

Member 10 or member 12 may also be provided with Braille indicia corresponding to the capital letters indicated above in corresponding positions.

Member 12 may be provided with markings opposite each rod for indicating numerical values for the sliders on the respective rods, as follows:

For rod 1: 1 (for units)
For rod 2: 10 (for tens)
For rod 3: 100 (for hundreds)
For rod 4: 1000 (for thousands)
For rod 5: 10M (for ten thousand)
For rod 6: 100M (for one hundred thousand)
For rod 7: 1,000M (for one million)
For rod 8: 10,000M (for ten million)

In using the invention, all of the counters are normally moved as far to the right as possible. Addition is performed by moving appropriate counters to the left and subtraction by moving appropriate counters to the right. To illustrate the use of the invention by means of a particular example, reference being made especially to Figs. 10, 11 and 12:

To add:
```
3,261      32.61
4,984  or  49.84
-----      -----
8,245      82.45
```

Set 3,261 as in Fig. 10, by moving counters on the four lower rods to the left.

Add 4,000 by moving four sliders on rod 4 to the left.

Add 900 by moving one slider on rod 4 to the left (equivalent to adding 1,000), and moving one slider on rod 3 to the right.

Add 80 by moving one slider on rod 3 to the left (equivalent to adding 100), and moving two sliders on rod 2 to the right.

Add 4 by moving 4 sliders on rod 1 to the left.

This gives 8,245 as in Fig. 11, or, if dollars and cents are involved, $82.45.

To continue by adding:
```
 8,245
 6,384
------
14,629
```
(as in Fig. 11)

Add 6,000 by moving one slider on rod 5 to the left (thereby adding 10,000), and moving four sliders on rod 4 to the right, making a net addition of 6,000.

Add 300 by moving three sliders on rod 3 to the left.

Add 80 by moving one slider on rod 3 to the left (thereby adding 100), and moving two sliders on rod 2 to the right, making a net of 80.

Add 4 by moving four sliders on rod 1 to the left.

This gives 14,629, as in Fig. 12, or if dollars and cents are involved, $146.29.

To subtract:
```
$146.29
 -63.84
-------
$ 82.45
```
(as set in Fig. 12)

Set $146.29 as in Fig. 12.

Subtract $60.00 by moving one slider to the right on rod 5, (thereby removing 100) and moving four sliders to the left on rod 4, and adding 40, giving a net subtraction of $60.00.

Subtract $3.00 by moving three sliders to the right on rod 3.

Subtract $.80 by moving one slider to the right on rod 3, (thereby removing 100), and adding 20 by moving two sliders to the left on rod 2.

Subtract $.04 by moving four sliders to the right on rod 1.

This gives $82.45, as in Fig. 11.

To continue:
```
$82.45
-49.84
------
$32.61
```
(as set in Fig. 11)

Subtract $40.00 by moving four sliders on rod 4 to the right.

Subtract $9.00 by moving one slider on rod 4 to the right and moving one slider on rod 3 to the left.

Subtract $.80 by moving one slider on rod 3 to the right and moving two sliders on rod 2 to the left.

Subtract $.04 by moving four sliders on rod 1 to the right.

This leaves $32.61, as in Fig. 10.

As shown in Fig. 1, rods 1 and 2 are preferably close together to form one group, rods 3, 4 and 5 are positioned close together to form another group and rods 6, 7 and 8 are placed close together to form a third group. This grouping facilitates the rapid use of the abacus since the user can thereby more readily select the appropriate row of sliders corresponding to particular numerical values.

The grouping of Fig. 1 is particularly useful in dollars and cents calculations, where rods 1 and 2 carry the sliders indicating values up to 99 cents.

Where other calculations are involved, the entire abacus may be turned around as shown in Fig. 2, where the first six rows, reading from the bottom, indicate values up to 999,999. One or both side members 10 and 12 may be provided with appropriate Braille or numerical indicia, or both.

As mentioned above, the enlarged sliders 20 may be of various shapes; two adjacent sliders may be of the same shape; however one slider of a pair could be of one shape, while its companion slider could be of a different shape, so as to make them more readily distinguishable, both to the eye and to the sense of touch; for example, the fifth slider could be circular or serrated, while its adjoining sixth slider could be hexagonal. Again, especially where dollars or cents calculations are involved, the enlarged fifth and sixth sliders 20 on rods 3, 4 and 5 could be, say, circular, while the enlarged fifth and sixth sliders on rods 1 and 2, indicating up to 99 cents, could be serrated, square, hexagonal, etc.

Another modification is shown in Figs. 13 and 14 where a flat face 26 of an enlarged slider 20, such for example, as the sixth, here shown as hexagonal, is provided with indicia, such for example, as a small raised hexagon 27, or Braille indicia 28, or both. The opposite face 29 could be provided with any other desired indicia. For example, if calculations involving weight are involved, the indicia on face 29 (or 26) could be in ounces; if linear measure in involved, the indicia on face 29 (or 26) could be in inches, or in fractions of a yard. Such specially marked counters, for ounces, inches, fractional values, etc., would preferably be on rod 2.

In order to have the desired indicia on the top flat surface of the slider always uppermost, the slider, as shown in Figs. 13 and 14, is non-rotatably mounted on its rod, by having a squared hole engageable with a squared or flat sided rod 30, the rod 30 being non-rotatably mounted in a squared socket (16) in the frame. By moving rod 30 to the left, as in Fig. 3, to compress the spring 18, the rod can be removed, the slider set with the desired indicia uppermost, and the rod replaced. The desired indicia would stay uppermost, because the sliders cannot rotate on rods 30.

There has been produced an improved abacus, useable both by the seeing and the blind, with accuracy and speed, due especially to the structurally different sliders 20 and 20', and to the use of Braille or similar indicia perceptible to the blind. It may be used commercially, in offices and stores, or in schools for instruction in arithmetic, both for the seeing and the blind. The rods carrying the sliders are readily removable and replaceable, as described. The sliders may themselves carry indicia, if desired, as in Figs. 13 and 14; different faces of the same slider may carry different indicia, and the desired indicia may be set to remain facing the user, by reason of the quick-detachable mounting for the rods, and the non-rotatable mounting of the sliders on the rods, as in Figs. 13 and 14.

While the abacus of this invention has been described in some detail, it should be understood that the invention is not to be limited to these details, but may be carried out in other ways.

I claim as my invention:

1. An abacus, comprising counters in sets of ten slidable on rods, the fifth and sixth of each set of counters differing in size from the other counters on that rod, for differentiating such fifth and sixth counters to the eye and to the sense of touch, from the other counters of its set.

2. An abacus, comprising a frame, rods arranged in three successive groups of two rods, three rods, three rods, carried by said frame, a set of ten counters on each rod, the fifth and sixth counter on each rod differing in size and shape from the others on that rod, so as to distinguish such fifth and sixth counters to the eye and to the touch, and Braille indicia carried by the frame, for indiciating to the blind, the numerical values for each set of counters.

3. An abacus, comprising a frame, rods carried by said frame, a set of ten counters slidable on each of said rods, the fifth and sixth counter on each rod being larger than, and having a peripheral edge different in shape from the other counters on its rod, thereby differentiating such larger counters both to the eye, or to the touch of a blind person.

OSCAR SEIDENBERG.

References Cited in the file of this patent

UNITED STATES PATENTS

| Number | Name | Date |
|---|---|---|
| 37,825 | Reffelt | Mar. 3, 1863 |
| 442,612 | Neuhaus | Mar. 5, 1890 |
| 637,964 | Johnsen | Nov. 28, 1899 |
| 826,732 | Monachimoff | July 24, 1906 |
| 1,233,544 | Bissey | July 17, 1917 |
| 1,454,013 | Boulton | May 1, 1923 |
| 1,863,683 | Bowles | June 21, 1932 |
| 1,998,063 | Wessborg | Apr. 16, 1935 |
| 2,228,554 | Brown | Jan. 14, 1941 |
| 2,289,717 | Montgomery | July 14, 1942 |

FOREIGN PATENTS

| Number | Country | Date |
|---|---|---|
| 692 | Great Britain | 1899 |
| 11,645 | Great Britain | 1898 |
| 12,314 | Great Britain | 1907 |
| 177,936 | Great Britain | 1922 |
| 363,391 | Germany | 1920 |